US009996081B2

(12) United States Patent
Owens et al.

(10) Patent No.: US 9,996,081 B2
(45) Date of Patent: Jun. 12, 2018

(54) AUTONOMOUS VEHICLE APPLIQUE

(71) Applicant: Micro Systems, Inc., Fort Walton Beach, FL (US)

(72) Inventors: Michael Owens, Fort Walton Beach, FL (US); Thomas K. Ferguson, Fort Walton Beach, FL (US)

(73) Assignee: SUNTRUST BANK, Atlanta, GA (US)

( * ) Notice: Subject to any disclaimer, the term of this patent is extended or adjusted under 35 U.S.C. 154(b) by 48 days.

(21) Appl. No.: 15/066,943

(22) Filed: Mar. 10, 2016

(65) Prior Publication Data
US 2017/0261988 A1    Sep. 14, 2017

(51) Int. Cl.
*H04L 29/06* (2006.01)
*G05D 1/02* (2006.01)
*B62D 15/02* (2006.01)
*G05D 1/00* (2006.01)

(52) U.S. Cl.
CPC ........... *G05D 1/021* (2013.01); *B62D 15/025* (2013.01); *G05D 1/0011* (2013.01)

(58) Field of Classification Search
CPC ..... B62D 15/026; G05D 1/021; G05D 1/0011
USPC ........................................................ 180/443
See application file for complete search history.

(56) References Cited

U.S. PATENT DOCUMENTS 3,003,363 A * 10/1961 De Hart .............. B25B 27/0035
                                                              180/321
5,615,581 A *  4/1997 Cordioli ................... B60S 5/00
                                                              33/203
5,865,266 A     2/1999 Froelich et al.
6,259,980 B1    7/2001 Peck et al.
7,648,004 B1 *  1/2010 Larouche ................ B62D 1/00
                                                              180/443
8,230,964 B2 *  7/2012 Markfort ............ B60R 25/0211
                                                              180/443

(Continued)

FOREIGN PATENT DOCUMENTS

DE        102013101630 A1    8/2014

OTHER PUBLICATIONS

VEST. "DARPA Grand Challenge 2005; Technical Paper for Flying Fox Autonomous Vehicle Systems."

(Continued)

*Primary Examiner* — Jacob D Knutson
*Assistant Examiner* — Felicia L. Brittman
(74) *Attorney, Agent, or Firm* — Procopio, Cory, Hargreaves & Savitch LLP

(57) ABSTRACT

This disclosure provides a device and a system for retrofitting a vehicle for unmanned operation. The system can have a navigation computer that can provide commands to a plurality of actuators for manipulating the onboard controls of a vehicle. The navigation computer can receive input from one or more remote operators and from a variety of sensors. The plurality of actuators can include a steering actuator that surrounds a steering column or a steering column housing to engage with a steering wheel of the vehicle. The steering actuator can have tongs that engage the steering wheel. The tongs can be coupled to an inner gear ring that can rotate within an outer housing of the steering actuator. Rotation of the tongs can interact with and move the steering wheel in response to commands from the navigation computer.

20 Claims, 10 Drawing Sheets

(56) References Cited

U.S. PATENT DOCUMENTS

| | | | |
|---|---|---|---|
| 8,255,093 B2* | 8/2012 | Layton | G05D 1/0038 |
| | | | 701/2 |
| 8,983,680 B2 | 3/2015 | Takach | |
| 9,141,111 B2 | 9/2015 | Webber et al. | |
| 9,164,508 B1 | 10/2015 | Takach | |
| 2006/0149446 A1 | 7/2006 | Nelson | |
| 2008/0269015 A1 | 10/2008 | Ochiai | |
| 2009/0099710 A1* | 4/2009 | Takach, Jr. | B60T 7/16 |
| | | | 701/2 |

OTHER PUBLICATIONS

Perrone Robotics. "Drop-in Autonomy Kit (DAK)." Source: http://www.perronerobotics.com/dak/ Date Accessed: Oct. 29, 2015.
Kairos Autonomi. "Pronto4 Uomo; 10 Minute Rapid Install Kit." Data sheet. 2013.

* cited by examiner

AUTONOMOUS VEHICLE APPLIQUE

BACKGROUND

Technological Field

This disclosure relates to operation of autonomous vehicles. More specifically, this disclosure relates to devices and systems for retrofitting vehicles for autonomous or remote operation.

Related Art

There is a need for Unmanned Ground Vehicles (UGVs) for situations considered too dangerous for the drivers of these vehicles. For example, Truck Mounted Attenuators (TMAs), highway safety vehicles that carry an impact attenuator unit, place the safety driver in danger in the event the TMA is struck by an errant vehicle such as a semi-trailer truck. Operating such a vehicle in a leader/follower configuration would remove the driver from the TMA and place him in a separate and safer lead vehicle. The military also has a need for UGVs for various applications involving urban warfare, explosive ordnance removal, live fire training exercises, etc. Unmanned military vehicles can lower operating costs, eliminate expensive armor plating as protection against improvised explosive devices (IED), and reduce the incidence of vehicle accidents caused by driver fatigue.

Unmanned vehicles can be implemented through the use of drive-by-wire servo mechanisms that can be controlled remotely by a human operator, or as fully autonomous vehicles via the addition of advanced sensor packages and computerized guidance algorithms.

SUMMARY

In general, this disclosure describes systems and methods related to devices and systems for operating unmanned vehicles. The devices and systems disclosed herein can be employed to remotely or autonomously control unmanned vehicles. The unmanned vehicle system described herein can have a remote control station used to control a multi-platform applique kit (M-PAK). The M-PAK can be installed on a vehicle. The M-PAK can then be remotely operated or commanded in an autonomous or semi-autonomous mode. The M-PAK can have actuators used to control various systems onboard the vehicle for remote operation. The one or more vehicles can also be easily converted back to manual control at any time by simply manually overriding the actuators and without having to remove any UGV subassemblies or servo mechanisms.

The systems and devices of this disclosure each have several innovative aspects, no single one of which is solely responsible for the desirable attributes disclosed herein.

One aspect of the disclosure provides a device for retrofitting a vehicle for unmanned operation. The device can have an outer housing having a gear race. The device can also have an inner gear ring having a plurality of attachment points and located in the gear race. The device can also have at least one tong coupled to the inner gear ring at one or more attachment points of the plurality of attachment points and configured to engage with a steering wheel of the vehicle. The device can also have a servo motor having a pinion gear drivingly engaged with the inner gear ring within the gear race, the servo motor configured to receive commands from a navigation computer.

Another aspect of the disclosure provides a system for operating an unmanned vehicle. The system can have a memory configured to store navigation data. The system can also have a processor coupled to the memory and configured to generate commands for control of the vehicle. The system can also have a steering actuator being coupled to the processor and operable to rotate a steering wheel of the vehicle according to the commands. The steering actuator can have one or more tongs operable to engage one or more spokes of the steering wheel without being coupled to the steering wheel.

Another aspect of the disclosure provides a steering actuator for an unmanned vehicle, the unmanned vehicle having a dashboard, a steering column, and a steering wheel having spokes. The steering actuator can have an outer housing formed to surround the steering column between the dashboard and the steering wheel, the outer housing having a gear race. The steering actuator can also have an inner gear ring disposed within the gear race. The inner gear ring can have a top surface formed with a plurality of attachment points and a plurality of gear teeth formed along a circumference of the inner gear ring. The steering actuator can also have one or more tongs coupled to one or more attachment points of the plurality of attachment points. The one or more tongs can extend through an interior portion of the steering wheel and interacting with the spokes without being coupled to any portion of the steering wheel. The steering actuator can also have a servo motor coupled to the outer housing and operable to move the inner gear ring and the tongs.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Figure 1:
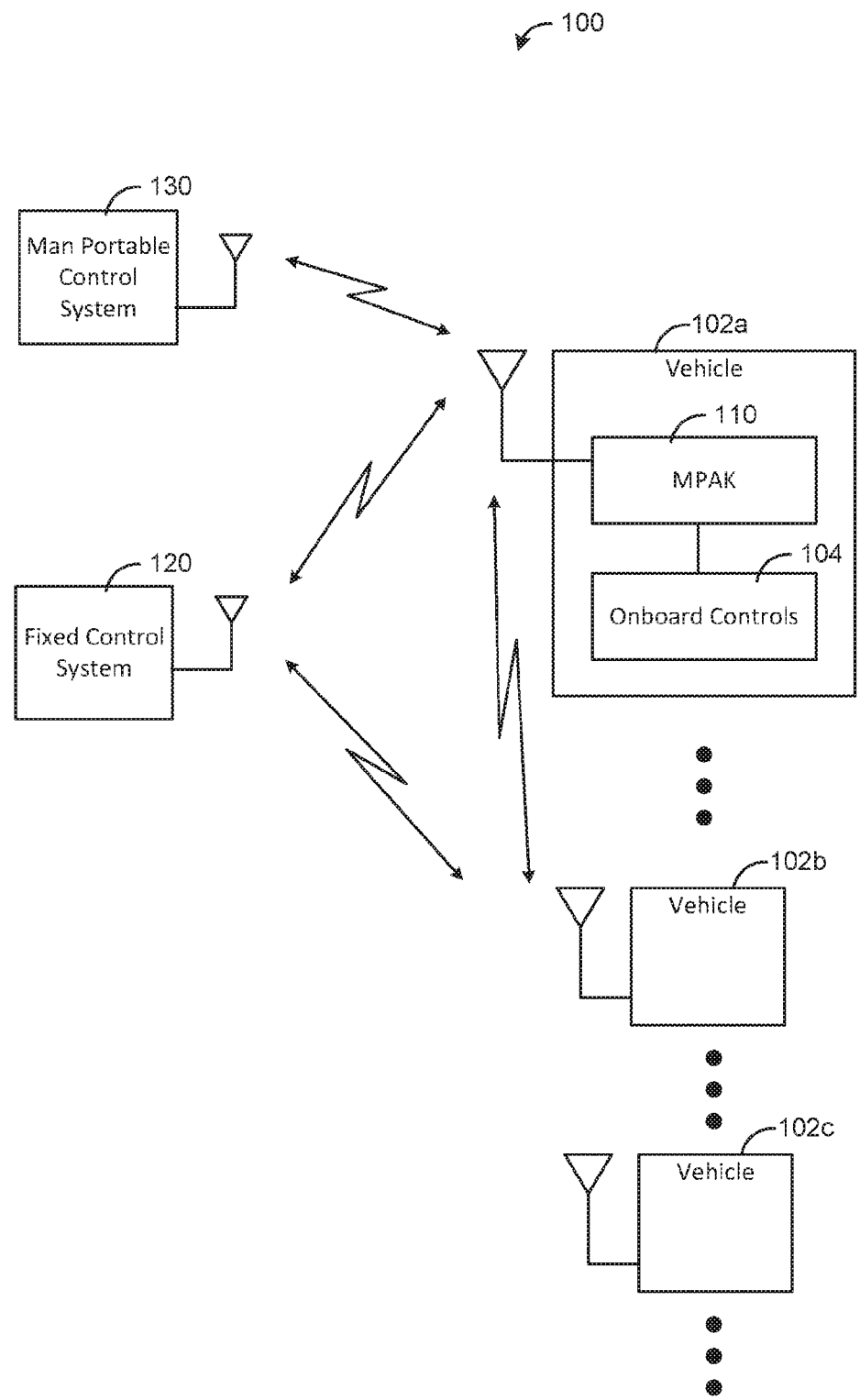
FIG. 1 is a functional block diagram of an embodiment of an unmanned vehicle system.

FIG. 1 is a functional block diagram of an embodiment of an unmanned vehicle system. An unmanned vehicle system (system) 100 can have one or more vehicles 102. Three vehicles 102 are shown, labeled as vehicles 102a, 102b, 102c but may be referred to collectively as the vehicles 102, or generally as the vehicle 102.

The vehicles 102 can have an onboard control system (onboard controls) 104. The onboard controls 104 can be one or more standard controls of a common vehicle. For example, the onboard controls 104 can have a steering wheel, an accelerator, a brake pedal, and a gear shifter, to name a few common controls. A user, such as a driver, for example, can manipulate the onboard controls 104 and operate the vehicle 102. In such a case, the vehicle 102 can be referred to as a manned vehicle.

In some embodiments, the vehicle 102 can have a multi-platform applique kit (M-PAK) 110 installed. The M-PAK 110 can be operably coupled to the onboard controls 104 for unmanned operation. The M-PAK 110 can have a series of actuators that are coupled to the onboard controls 104. For example, there can be actuators that control the steering, shifting, and braking, for example. In some embodiments, the M-PAK 110 can perform the functions of an operator in the manned vehicle 102. In such an embodiment, the vehicle 102 is can be termed a UGV.

In some embodiments, the M-PAK 110 can be in wireless communication with a fixed control system 120. In some embodiments the fixed control system 120 is mobile or moveable. The fixed control system 120 can allow a remote operator to send commands to the M-PAK 110 to remotely control the vehicle 102 in a semi-autonomous mode. In the semi-autonomous mode, the M-PAK 110 can receive commands from the fixed control system 120 whereby an operator can actively control the direction of travel and speed of the vehicle 102 via the M-PAK 110. In some other embodiments, an operator at the fixed control system 120 can send commands to the M-PAK 110 to operate the vehicle 102 in an autonomous mode. In the autonomous mode, the M-PAK 110 can store and execute a mission plan, for example. The mission plan can have a series of commands that control the vehicle 102 or propel the vehicle 102 along a predetermined route without little or no additional human input or interaction. For example, the M-PAK 110 can be installed in the vehicle 102 that is part of a convoy following a predetermined route.

In some embodiments, the fixed control system 120 can have a steering wheel simulator, a brake and throttle pedal simulators, gear shift simulator, laptop computer, and data radio, for example.

In some other embodiments, the system 100 can also have a man portable control system 130. The man portable control system 130 can be a remote system used by an operator in the field. The man portable control system 130 can be a small, portable console can have a user interface allowing the operator to send mission plan updates, turn-by-turn instructions, and other commands to the M-PAK 110 for operation of the vehicle 102. Both the man portable control system 130 and the fixed control system 120 can communicate wirelessly to the M-PAK 110. Such wireless communication can be line-of-sight (LOS) communication such as via cellular or other radio communication, or over-the-horizon (OTH) communication using, for example, one or more radio relays, long range radio transmissions, or a satellite link.

The man portable control system 130 can have, for example, a ruggedized tablet computer that is connected to a portable data radio. The tablet computer can allow the operator to control the vehicle 102 by sight at short distances without requiring a direct video feed from the vehicle's camera.

In some embodiments, the system 100 can operate all of the vehicles 102 (e.g., the vehicles 102, 102b, 102c) operating as UGVs. This can allow a single operator at the fixed control system 120 or the man portable control system 130 to control the one or more vehicles 102 at simultaneously. In an embodiment, a plurality of vehicles 102 can be commanded into a leader-follower role. For example, a lead vehicle 102a can be set to follow a mission plan in an autonomous mode or sequential commands in a semi-autonomous mode. In the same example, multiple follower vehicles 102b, 102c can be set in an autonomous mode to follow the lead vehicle 102. In such an example, the lead vehicle 102 can be manned or unmanned. This arrangement can allow manned and unmanned vehicles to perform cooperatively in tactical movement operations.

In many circumstances, only one of the fixed control system 120 and the man portable control system 130 may control the vehicle 102 at a time. However, in some embodiments, control of the vehicle 102 can be transferred from one of the fixed control system 120 and the man portable control system 130 to the other via wireless communications.

During convoy operations, the Leader vehicle (e.g., the vehicle 102a) can transmit its own velocity, heading, and position information to follower vehicles (e.g., the vehicles 102b, 102c) using periodic packet messages referred to herein as electronic breadcrumbs ("eCrumbs"). The eCrumbs can be transmitted periodically to let the Follower vehicles 102b, 102c know precisely where the Leader vehicle 102a is as it travels along its intended route. In some embodiments, the eCrumbs can be transmitted at a rate of two messages per second. The M-PAK 110 is able to operate in urban environments, mountainous areas, inside tunnels, through heavy foliage, etc., and can also operate in harsh weather conditions such as rain, snow, sand, and dust.

An advantage of the M-PAK Leader/Follower system is that the Followers do not need to know about the environment around them, or even about their own physics of motion. The Followers only need to know what the Leader does at each eCrumb and then do the same thing when they get there. In this way, the safe operation of all vehicles is assured by the remote operator or a human driver in the Leader vehicle 102a.

Figure 2:
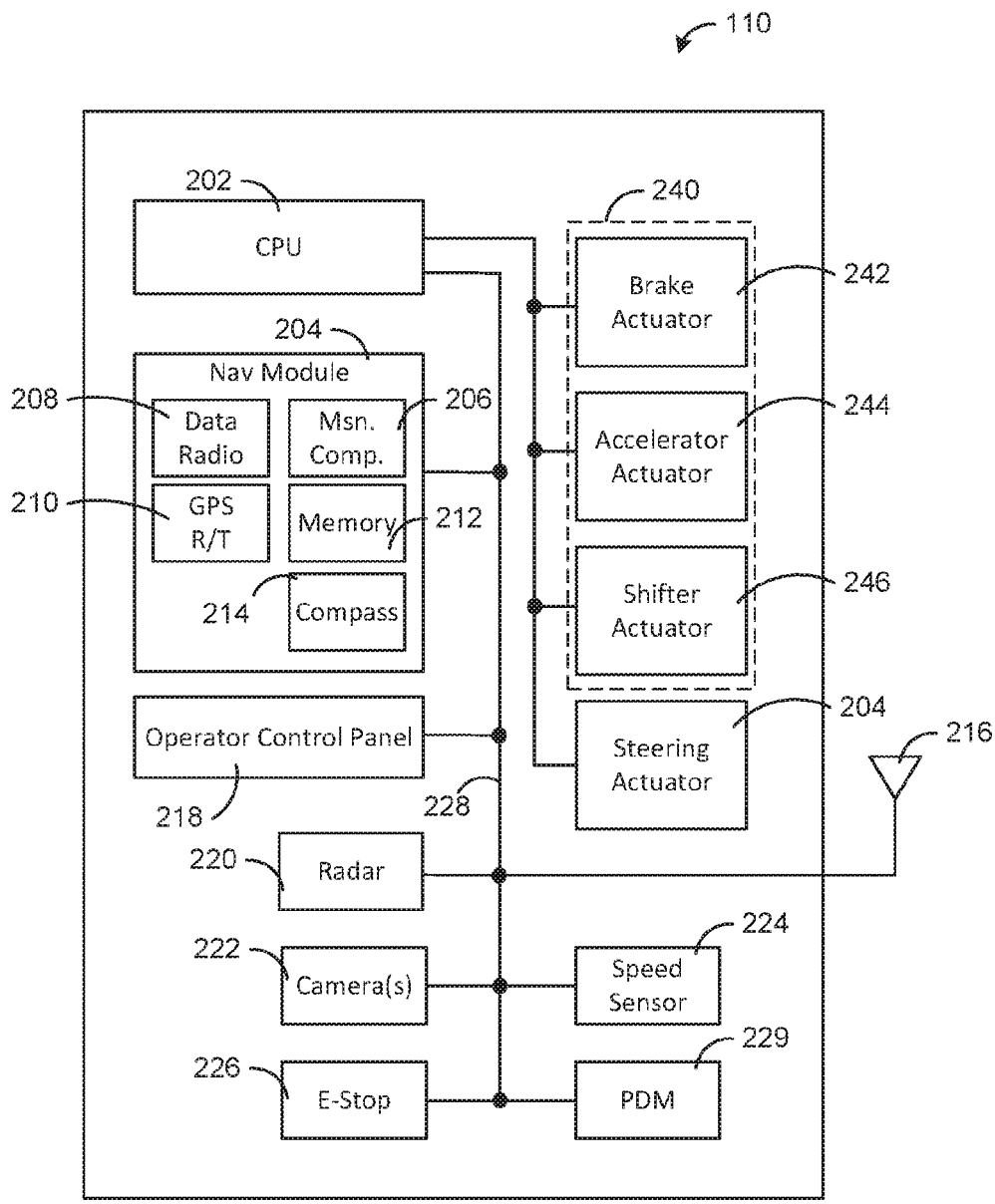
FIG. 2 is a functional block diagram of the unmanned vehicle applique of FIG. 1.

FIG. 2 is a functional block diagram of the multi-platform applique kit of FIG. 1. The MPA-K 110 can have a central processing unit (CPU) 202. The CPU 202 can be implemented as one or more processors. The CPU 202 can be coupled to a navigation module (nav module) 204. The nav module 204 can have a mission computer 206. The mission computer 206 can be programmed for a specific mission and provide commands to the CPU 202 for to control the vehicle 102. The nav module 204 can also have a data radio 208. The data radio 208 can receive input from, for example, the fixed control system 120 or the man portable control system 130. The data radio 208 can also relay eCrumbs (position and other mission-critical information) from the mission computer 206 to external receivers via an antenna 216. The antenna 216 is shown as a single antenna but can be implemented as more than one antenna 216.

The nav module 204 can also have a global positioning system (GPS) receiver 210. The GPS receiver can provide position information to the mission computer 206. The nav module 204 can also have a memory 212 for storing mission-related data. The memory 212 can be programmed with mission information, plans, and/or stored commands. The nav module 204 can also have a compass 214 to provide additional direction information to the mission computer 206. The CPU 202, the nav module 204, and the mission computer 206 are depicted as separate components, however in some embodiments, functions of each can be separated or combined into one or more components as required by a given implementation.

In some embodiments, the nav module 204 can be a self-contained device to house a the mission computer 206, the compass 214, the GPS receiver 210, the data radio 208, and associated antennas 216, all of which can be contained in an aerodynamic housing that is attached to the roof or hood of the vehicle 102. The nav module 204 can be tied down using, for example, one or more straps, or mounted to an external surface using optional rubber-coated magnets. In some other embodiments, the nav module 204 can be bolted or otherwise fastened directly to the vehicle 102 for more permanent installations.

In some embodiments, the M-PAK 110 can have an operator control panel 218. The operator control panel 218 can allow a user or operator to engage and disengage the system allowing either manual operation of the vehicle 102 or autonomous/semi-autonomous operation from the fixed control system 120 or the man portable control system 130. The operator control panel 218 can also have switches and indicators that let the driver configure the system prior to the start of convoy operations. The operator control panel 218 can also have controls to allow the vehicle 102 to function in a leader role or the follower role as required. The operator control panel 218 can be located or installed within easy reach of a driver (e.g., near the driver's seat).

The M-PAK 110 can also have a power and data bus (bus) 228. The bus 228 can connect each of the individual components of the M-PAK 110 and distribute power and convey data between the parts. In some embodiments, the bus 228 can receive power from a power distribution module (PDM) 229. The PDM 229 can be the electrical hub of the M-PAK system, delivering power to some or all of the components of the M-PAK 110 via the bus 228.

The M-PAK 110 can also have an emergency stop (e-stop) 226. The e-stop 226 can send a command to the CPU 202 to immediately stop the vehicle 102 under any driving condition. The e-stop can send an interrupt command directly to the actuators 240 or indicate a need to the CPU 202 to actuate the brake. The e-stop 226 can be a button or switch on the operator control panel 218. The e-stop 226 can also be implemented as one or more buttons mounted externally on the vehicle 102. The internal and external buttons can be wired in series allowing a collision with a leader/follower vehicle, or a manual input to immediately cease vehicle movement.

In some embodiments, the follower vehicles 102b, 102c can be fitted with external e-stops 226 that can be magnetically attached to the exterior surfaces. The e-stops 226 can allow an operator to command an immediate and full stop in the event of an emergency. When an e-stop 226 switch is activated, all power can be removed from the servos (steering, throttle, brake, and transmission), the engine's ignition can be shut off (or the fuel supply is cut off if it is a diesel engine), and full brakes are applied using an independent servo actuator. At the same time, a signal is sent to the leader vehicle (e.g. the vehicle 102a) to notify the driver that an e-stop event has occurred. The activated switch remains in the STOP position until manually reset by the operator. The e-stop system is simple to use and independent from all other M-PAK systems in order to provide a safe and reliable method for terminating vehicle motion in the event of an emergency. The e-stops 226 can be magnetically attached to the vehicle 102 and the bus 228.

The M-PAK 110 can also have plurality of sensors, such as a radar 220, one or more cameras 222, and one or more speed sensors 224. The radar 220 can be implemented to track surrounding vehicles (e.g., the vehicle 102b can track the vehicles 102a, 102c) or terrain. The radar 220 can sense objects that get in the vehicle's way. In some embodiments, the radar 220 can be implemented to detect pedestrians or other vehicles. In some embodiments, the CPU 202 can ignore objects sensed by the radar 220 that are not moving (with respect to the vehicle 102), such as other vehicles in the convoy. In some embodiments, the radar 220 can sense an object in the way and the nav module 204 can command the vehicle 102 to stop until it is safe to proceed. In some other embodiments, the radar 220 can be a part of advanced obstacle detection system that can detect objects and avoid or go around them if possible.

The radar 220 can further operate in conjunction with the speed sensor 224 to allow better control of the vehicle 102. The speed sensor 224 can be, for example, a Doppler radar. Each of these sensors can feed information to the CPU 202, the mission computer 206, or to a remote operator at the fixed control system 120 or the man portable control system 130, via the antenna 216.

The camera 222 can allow remote option of the vehicle 102 using a video link. The camera 222 can be implemented as one or more vehicle-mounted cameras. The operator can use either the fixed control system 120 or the man portable control system 130 to control the vehicle 102 via the visual cues provided by the camera 222.

The M-PAK 110 can also have a plurality of actuators 240. The actuators 240 can be linear actuators that can be installed on various controls of the vehicle 102. As used herein, the actuators 240 can include a brake actuator 242, an accelerator actuator 244, and a shifter actuator 246. Each of the actuators 240 can be implemented, for example, as a hydraulic or electro-mechanical actuator or servo that can be commanded by the mission computer 206 or via the CPU 202 to manipulate the associated control (e.g., the onboard controls 104). As the individual names imply, the actuators 240 can be operably coupled to, for example, the brake pedal, accelerator pedal, and the shifter of the vehicle 102. In some embodiments, the actuators 240 can be coupled to the various controls via a rigid connection or via one or more wires or cables.

In some embodiments, the shifter actuator 246 can be coupled to the mechanical controls for an automatic transmission, for example. The actuators 240 can be installed on a metal plate, for example, that is bolted to the floor of the vehicle 102 or to some other available internal structure. The actuators 240 can connect to the driver pedals (e.g., gas pedal and brake pedal) using mechanical cables that are routed under the driver's floor mat to prevent interference with the optional safety driver.

In some embodiments, the actuators can provide electronic signals to one or more of the onboard controls 104 (e.g., when the vehicle includes one or more electronically controlled systems such as the accelerator). For example, the shifter actuator 246 may not be present in a vehicle 102 having an electronic transmission. In such an embodiment, the transmission or shifting routines can be controlled directly by the CPU 202.

The M-PAK 110 can also have steering actuator 300. The steering actuator 300 can be a servo-operated, rotating actuator that can engage with the steering wheel. As described in the following figures, embodiments of the steering actuator 300 can be mounted without having to remove the steering wheel and actually "floats" around the steering column. Once the mounting brackets are installed the actuator itself can be quickly and easily removed/installed.

The actuators 240 and the steering actuator 300 can allow an optional safety driver to take full control of the vehicle 102 at any time without removing or disconnecting any actuators 240 or the steering actuator 300. The actuators are located inside the vehicle in areas that avoid interfering with a safety driver. The vehicle 102 can be returned to manual operation at any time by simply removing power from the M-PAK servos using, for example, a toggle switch on the operator control panel 218.

Figure 3:
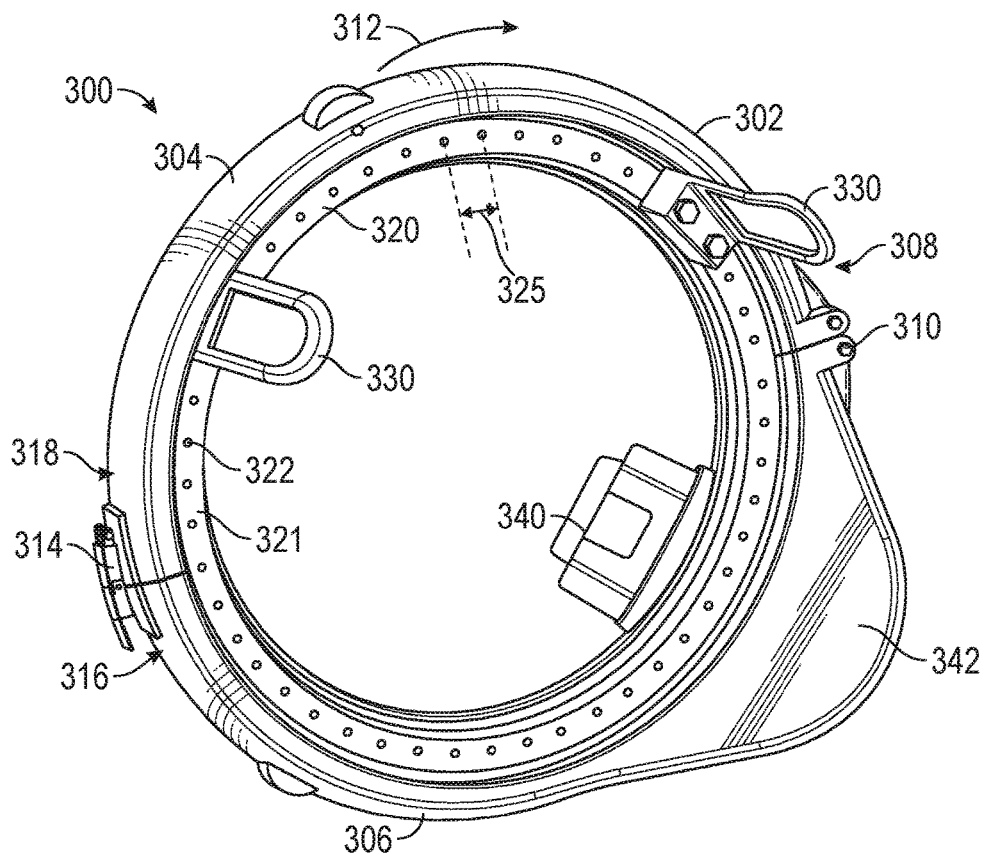
FIG. 3 is a top perspective view of an embodiment of a steering actuator of the unmanned vehicle applique of FIG. 2.

FIG. 3 is a top perspective view of an embodiment of a steering actuator of the unmanned vehicle applique of FIG. 2. The steering actuator 300 can have an outer housing 302. The outer housing 302 can have an upper portion 304 and a lower portion 306. The upper portion 304 and the lower portion 306 can each have a semi-circular shape or a shape that forms a portion of a circular shape, such that when coupled, the outer housing 302 can have an approximately circular inner circumference to surround a steering column. The upper portion 304 and the lower portion 306 can be hingably coupled by a hinge assembly having one or more pins 310. As shown, the hinge assembly is shown with two pins 310 allowing the upper portion 304 to rotate away from the lower portion 306. In some embodiments, the hinge assembly may have a single pin 310.

In some embodiments, the steering actuator 300 can have a connecting assembly 314 on a fastener end 316 of the lower portion 306. The connecting assembly 314 can secure a fastener end 318 of the upper portion 304 to the fastener end 316 of the lower portion 306. The connecting assembly 314 can, for example, have a clasp on the fastener end 316 and catch on the fastener end 318. In some embodiments, the connecting assembly 314 can be a latch, a worm bolt, or other means allowing the fastener ends 316, 318 to be secured together. In some other embodiments, the connecting assembly 314 can have hardware such as a nut and bolt or a screw that threads into a portion of the fastener ends 316, 318 to secure them together (not shown). The pin 310 can allow the upper portion 304 to rotate or open away from the lower portion 306 in a direction indicated by an arrow (direction) 312. The upper portion 304 and lower portion 306 can then receive a steering column (see below) and close in a clamshell motion, opposite the arrow 312. The connecting assembly 314 can then secure the two portions of the outer housing 302 to surround a steering column.

In some embodiments, the hinge assembly and the pin 310 can be replaced by another coupler or connecting assembly, similar to the connecting assembly 314. Accordingly, in such an embodiment, the upper portion 304 can be detachable from the lower portion 306.

The steering actuator 300 can have an inner gear ring 320. The inner gear ring can be housed and configured or arranged to rotate within the outer housing 302. The inner gear ring 320 can have a plurality of attachment points 322 formed in a top surface 321. The steering actuator 300 can also have one or more tongs 330 coupled, affixed, or otherwise fastened to the inner gear ring 320 via the attachment points 322. The attachment points 322 can accommodate the tong(s) 330 in various configurations about the circumference of the top surface 321 of the inner gear ring 320. The attachment points 322 can, for example, be a series of attachment points separated by a spacing 325 and spaced about the top surface 321 of the inner gear ring 320. When installed in the vehicle 102, the tongs 330 can engage with the steering wheel (see below). The expression or phrase "to engage" or "engaged with" as used in relation to the steering actuator 300 and the tongs 330 can mean the tongs 330 are close to, touch, or interact to move the steering wheel, a portion of the steering wheel (e.g., the spokes of the steering wheel), as described below.

In some other embodiments, the attachment points 322 can alternatively be a series of protrusions extending away from the inner gear ring 320 (not shown). In such an embodiment, the tongs 330 can be secured to the attachment points 322 in an interference fit.

The steering actuator 300 can have a servo motor 340 coupled to the outer housing 302 at a protrusion 342. The servo motor 340 can engage with and drive the inner gear ring 320 in a circle and within the outer housing 302. The servo motor 340 can thus move the tongs 330 clockwise and counterclockwise about an inner perimeter of the outer housing 302. As the servo motor 340 turns, the tongs 330 also move. When installed in the vehicle 102, the servo motor 340 can turn the inner gear ring 320 which moves the tongs 330. The tongs 330 can then engage with and impart a rotational force on the spokes of the steering (see FIG. 9 and FIG. 10) wheel turning the steering wheel of the vehicle 102. In some embodiments, the tongs 330 are the only point of contact between the steering actuator 300 and the steering wheel. The tongs 330 can be installed anywhere along the inner gear ring 320 to accommodate different steering wheel spoke locations and configurations. The tongs 330 can also be custom designed to accommodate nearly any style or size of steering wheel. Two tongs 330 are depicted in this figure, though more or fewer may be implemented in some embodiments. In some embodiments, the tongs 330 are not coupled or otherwise secured to steering wheel.

Figure 4:
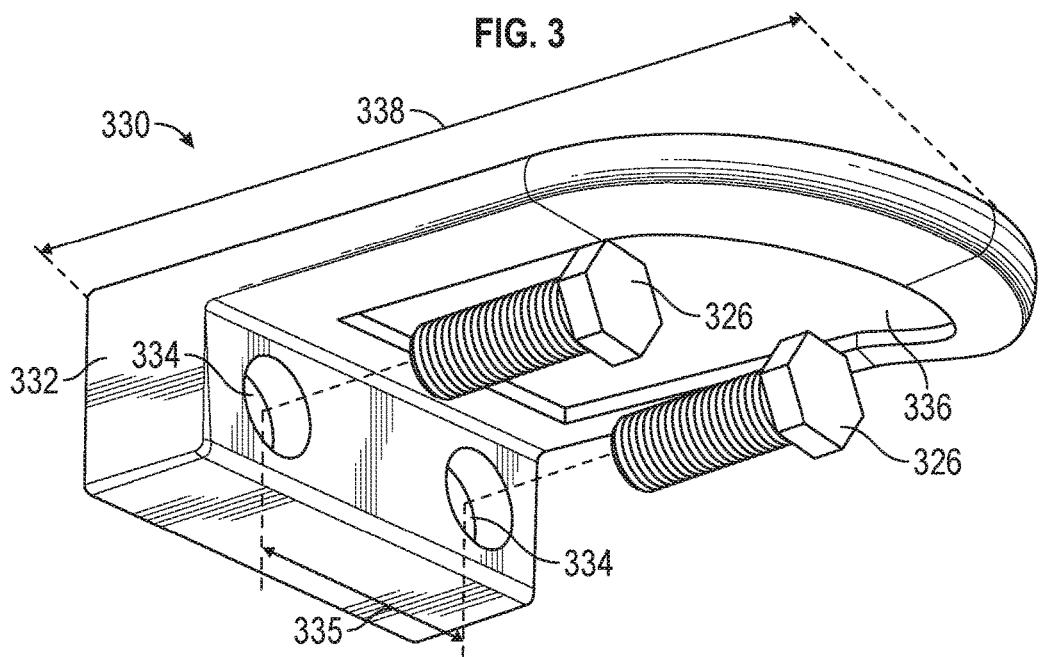
FIG. 4 is a top perspective view of an embodiment of a tong of the steering actuator of FIG. 3.

FIG. 4 is a top perspective view of an embodiment of a tong of the steering actuator of FIG. 3. The tong 330 can be coupled to or engaged with the inner gear ring 320. The tong 330 can have a flange 332. The flange 332 can have one or more tong attachment points 334. The tong attachment points 334 can interact or engage with the attachment points 322 on the inner gear ring 320 to secure one or more tongs 330 in a predetermined location about the circumference of the inner gear ring 320. The tong attachment points 334 can be spaced apart by a spacing 335. The spacing 335 can be similar to the spacing 325 (FIG. 3) to allow flexibility in the arrangement of the tongs 330 about the inner gear ring 320. The tong attachment points 334 can, for example, be holes having a shape and spacing to accommodate the spacing of the attachment points 322. In the embodiment disclosed above, tong attachment points 334 can be sized to receive the attachment points 322 configured as protrusions in an interference fit, securing them in a desired location on the inner gear ring 320.

In some embodiments, the tong attachment points 334 and the attachment points 322 can be aligned to receive a fastener 326. The fasteners 326 are shown as bolts, but can also be implemented as screws, pins, or other applicable fastening means.

In some embodiments, the attachment points 322 and/or the tong attachment points 334 can be holes or apertures configured to accept the fasteners 326. In such an embodiment, the attachment points 322 can be formed with internal threads sized to receive external threads of the fasteners 326. The fasteners 326 can then extend through the tong attachment points 334 and engage with the internal threads of the attachment points 322. In some embodiments, the tong attachment points 334 can be formed as apertures having internal threading (not shown) corresponding to the internal threading of the attachment points 322 to secure the fastener 326.

In some embodiments, the tong attachment points 334 can alternatively have an oblong shape (FIG. 7) to accommodate different designs, for example, when the spacing 335 and the spacing 325 are not similar or identical.

In some other embodiments, where the attachments points are protrusions as described above, the tong attachment points 334 can be formed to receive the attachment points 322 in an interference fit. The size, shape, and spacing of the attachment points 322 and the tong attachment points 334 can allow the tongs to be spaced about the inner gear ring 320 as desired.

The tong 330 can also have a tong arm 336. The tong arm 336 can extend away from the flange 332 and the top surface 321 of the inner gear ring 320 a distance 338, when installed. When the steering actuator 300 is installed within the vehicle 102, the tong arm 336 can engage with the spokes of the steering wheel (see below). The distance 338 can allow the tongs 330 can be installed anywhere along the top surface 321 of the inner gear ring 320 to accommodate different spoke locations. The tongs 330 and the tong arms 336 can have custom designs providing different lengths and different angles to accommodate different types of steering wheels. In some embodiments, the tongs 330 can have a curved structure or bends to accommodate certain structural aspects of the steering wheel in use.

Figure 5:
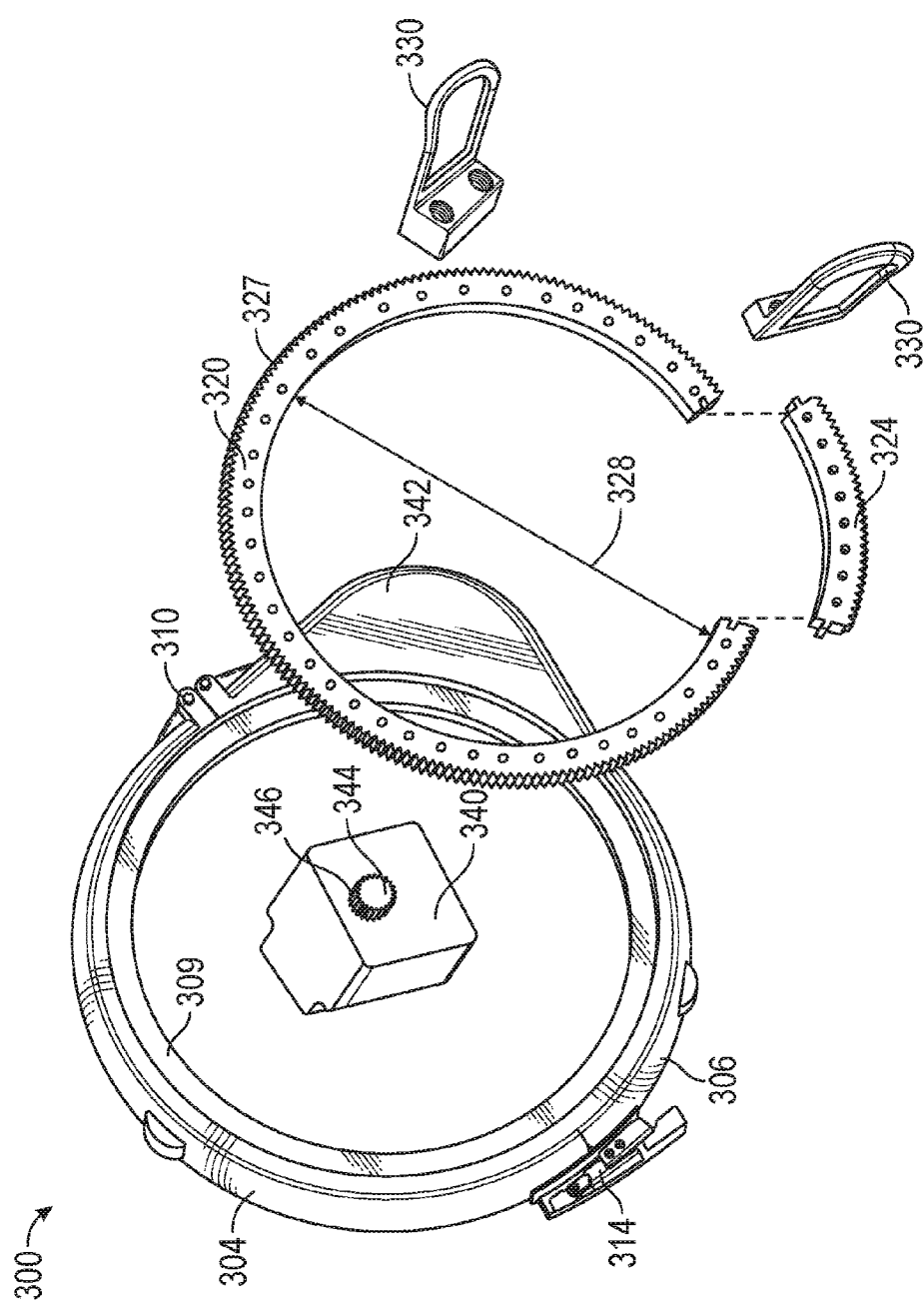
FIG. 5 is an exploded view of the steering actuator of FIG. 3.

FIG. 5 is an exploded view of the steering actuator of FIG. 3. The inner gear ring 320 can rest within the outer housing 302 on a gear race 309. The gear race 309 can support the inner gear ring 320 and allow it to rotate within the outer housing 302. The inner gear ring 320 can also have a removable gear ring section 324 to allow installation and removal of the steering actuator 300 around a steering column. The removable gear ring section 324 can also be referred to herein as removable gear section 324.

The inner gear ring 320 can have teeth 327 formed about a perimeter of the inner gear ring 320. In some embodiments the teeth 327 can be formed about an outer perimeter of the inner gear ring 320, as shown. In some other embodiments, the teeth 327 can be formed about an inner perimeter of the inner gear ring 320. Similarly, the servo motor 340 can have a pinion gear 344 with pinion teeth 346 that are formed corresponding to the teeth 327. The pinion teeth 346 can drivingly engage with the teeth 327. As the servo motor 340 turns, the pinion gear 344 turns, which then turns the inner gear ring 320 and the tongs 330.

In some embodiments, the inner gear ring 320 can have diameter 328. In some embodiments the diameter 328 can be approximately eight to twelve inches, and provide a gear ratio of approximately 12:1.

The inner gear ring 320 can be formed from a metallic material. In some embodiments, the inner gear ring can be a metal ring formed with teeth 327 formed from a polymer, such as nylon. In some other embodiments, the inner gear ring 320 and/or the teeth 327 can be formed of a non-metallic, polymer, or composite, material. In some embodiments, the pinion gear 344 can be formed of a metal, such as, for example, stainless steel. In some other embodiments, the pinion gear 344 can be formed of a polymer or composite.

Figure 6:
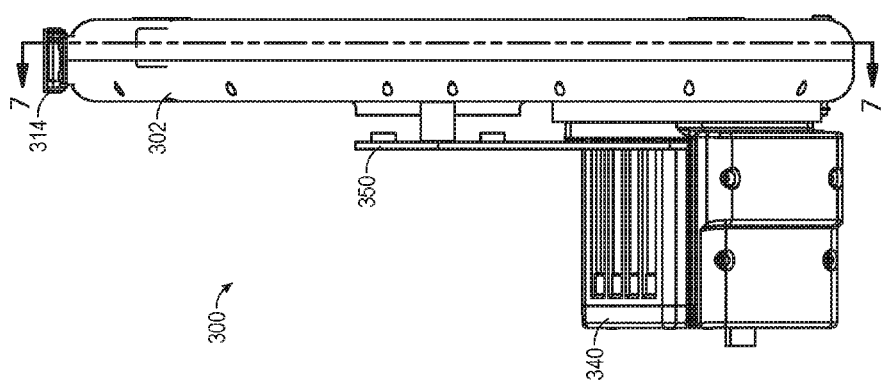
FIG. 6 is a bottom plan view of the steering actuator of FIG. 3.

FIG. 6 is a bottom plan view of the steering actuator of FIG. 3. The outer housing 302 can be affixed or otherwise mounted to a mounting plate 350. The mounting plate 350 can provide structural support for the steering actuator 300 and the servo motor 340. The servo motor 340 can be mounted to the mounting plate 350 such that the pinion gear 344 meshes with the inner gear ring 320, or more specifically, the pinion teeth 346 mesh with the teeth 327.

Figure 7:
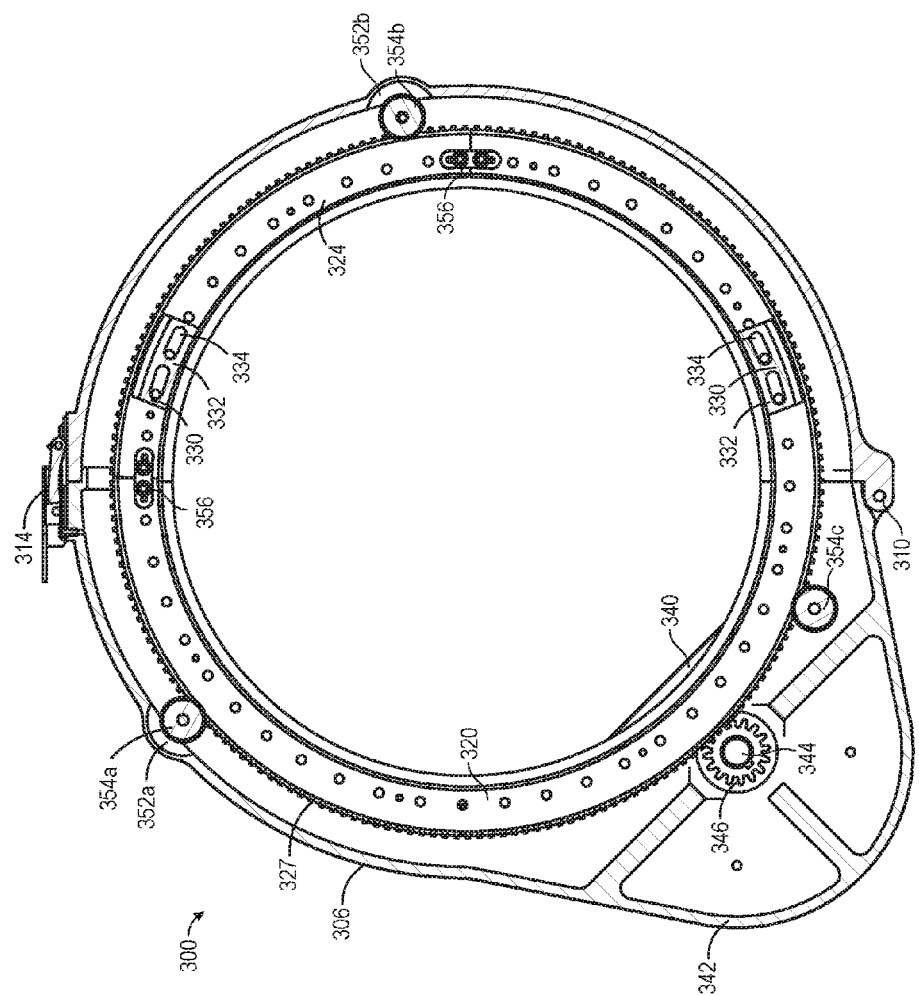
FIG. 7 is a is a cross section of the steering actuator taken along the line 7-7 of FIG. 6.

FIG. 7 is a cross section of the steering actuator taken along the line 7-7 of FIG. 6. In this view the inner gear ring 320 can be seen interacting with the pinion gear 344. The outer housing 302 can also have one or more roller housings 352. The roller housings 352 are shown as roller housing 352a and roller housing 352b. The roller housings 352 can house one or more rollers 354.

The rollers 354 are shown as a roller 354a, a roller 354b, and a roller 354c, but can be referred to collectively as the rollers 354. The rollers can be formed as small cylinders set within the roller housings 352. The rollers 354 can freely roll within the roller housings 352 to provide support for the rotation of the inner gear ring 320 within the gear race 309. Only three rollers 354 are shown but more or fewer may be implemented for the same or similar purpose. The one or more rollers 354 can have gear teeth corresponding to the teeth 327 that support the rotation of the inner gear ring 320. In some embodiments, the roller 354 can be smooth, having no teeth. In some other embodiments, the rollers 354 can have a channel formed about their circumference that does not mesh with the pinion teeth 346, but supports the rotation of the inner gear ring 320.

The removable gear ring section 324 can be affixed or otherwise fastened to the rest of the inner gear ring 320 by one or more fasteners 356. The fasteners 356 can be, for example, small screws or bolts that secure the removable gear ring section 324 to the inner gear ring 320 to make the inner gear ring a single component. In some embodiments, the removable gear ring section 324 can be snapped in place without the use of separate fasteners (e.g., the fasteners 356).

The tongs 330 are also shown in this view with the flanges 332. The tong attachment points 334 are also shown having an oblong shape. The oblong shape can allow the tongs 330 to be adjusted in a continuous range around the inner gear ring 320. The oblong shape of the tong attachment points 334 can also allow different tongs 330 to be used on an inner gear ring 320 with attachment points 322 that have a spacing 325 different from the spacing 335.

Figure 8A:
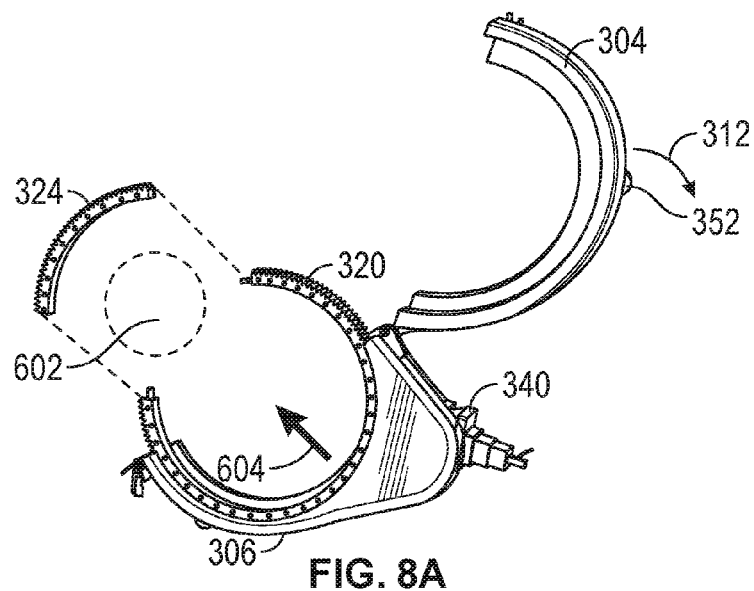
FIG. 8A is top perspective view of the steering actuator of FIG. 3 applied to a steering column.

FIG. 8A is top perspective view of the steering actuator of FIG. 3 applied to a vehicle. As noted above, the upper portion 304 can be rotated away from the lower portion 306 via the pin 310 in the direction 312. The removable gear ring section 324 can be removed from the inner gear ring 320 to accommodate a steering column 602 during installation. As used herein, the steering column is the portion of the vehicle 102 that rotates with the steering wheel and controls the direction of the wheels. The steering column 602 is represented as a dashed circle. The upper portion 304 of the steering actuator 300 can then be moved in a direction indicated by an arrow (direction) 604 to surround the steering column 602.

Figure 8B:
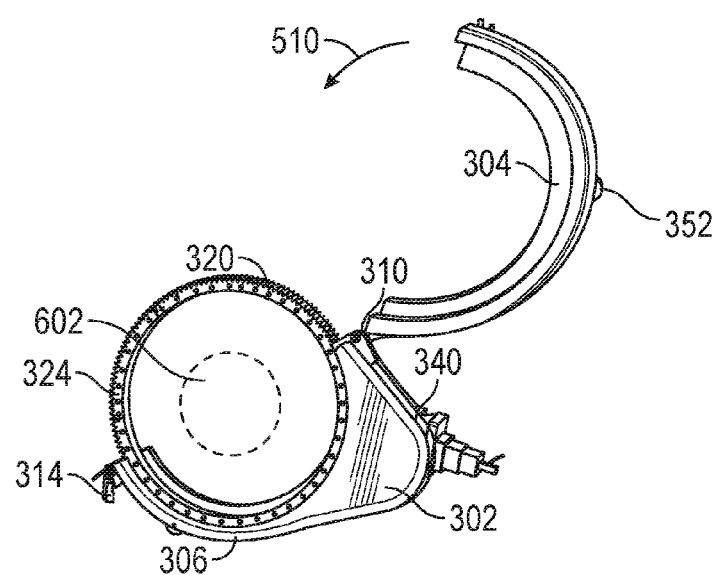
FIG. 8B is another top perspective view of the steering actuator of FIG. 3 applied to a steering column.

FIG. 8B is another top perspective view of the steering actuator of FIG. 3 applied to a steering column. Once the steering actuator is in place around the steering column 602, the removable gear ring section 324 can be reinstalled in the inner gear ring 320. The upper portion 304 of the outer housing 302 can then be rotated in a direction indicated by an arrow (direction) 510 via the pin 310.

Figure 8C:
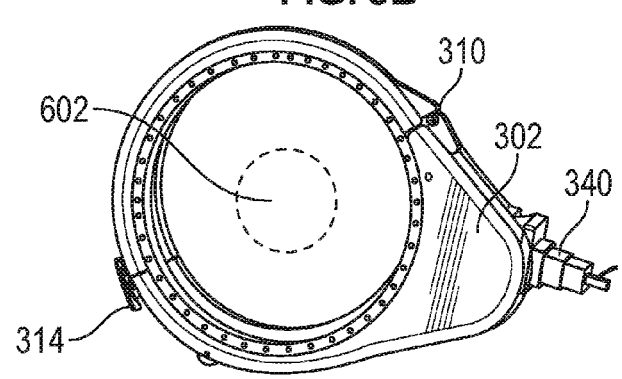
FIG. 8C is another top perspective view of the steering actuator of FIG. 3 applied to a steering column.

FIG. 8C is another top perspective view of the steering actuator of FIG. 3 applied to a steering column. Once the upper portion 304 is rotated back toward the lower portion 306, the connecting assembly 314 can be actuated, securing the outer housing 302 around the steering column 602.

Figure 9:
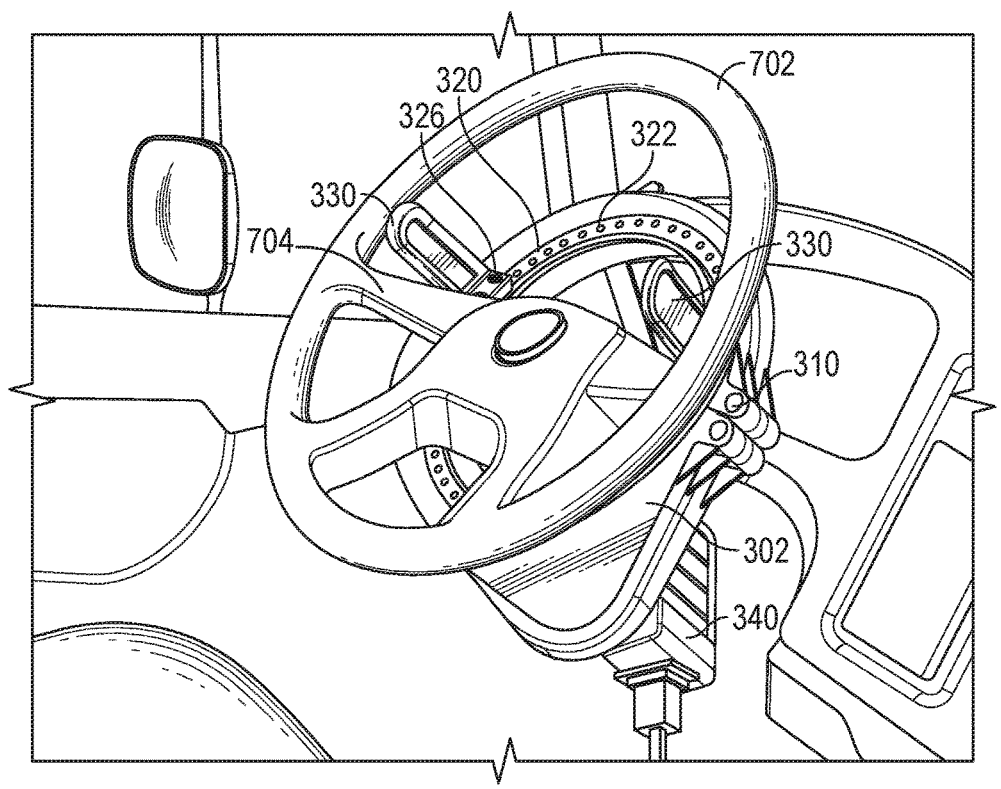
FIG. 9 is right perspective view of the steering actuator of FIG. 3 applied to a vehicle.

FIG. 9 is right perspective view of the steering actuator of FIG. 3 applied to a vehicle. After the process shown in FIG. 8A, FIG. 8B, and FIG. 8C is completed, the removable gear ring section 324 can be installed and the upper portion 304 is secured to the lower portion 306 using the connecting assembly 314. The steering actuator 300 can then surround the steering column 602 (FIG. 6).

The steering column 602 can be coupled to a steering wheel 702. The steering wheel 702 can have one or more spokes 704. The spokes 704 can provide one of a number of configurations coupling the steering wheel 702 to the steering column 602.

In some embodiments, the tongs 330 can extend the distance 338 (FIG. 4) through the inside or interior of the steering wheel 702 when coupled to the inner gear ring 320. The attachment points 322 can provide a mounting point for the tongs 330.

In some embodiments, the tongs 330 can extend the distance 338 only as far as required to contact the spokes. Accordingly, the steering actuator 300 does not impede use of the driver seat and manual manipulation of the steering wheel 702. Therefore, even with the steering actuator 300 installed, a driver can still easily drive the vehicle 102 in a manual mode.

Figure 10:
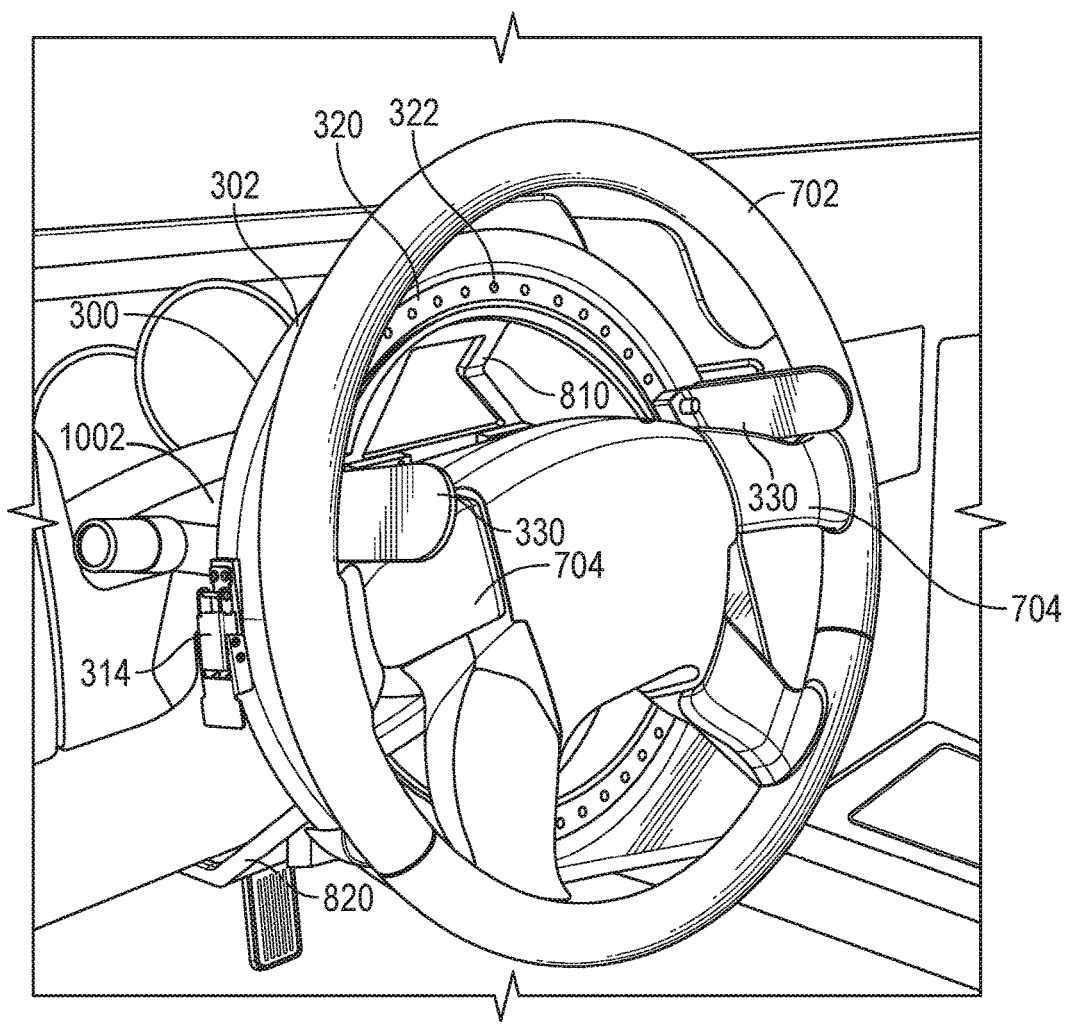
FIG. 10 is left perspective view of the steering actuator of FIG. 3 applied to a vehicle.

FIG. 10 is left perspective view of the steering actuator of FIG. 3 applied to a vehicle. The steering actuator 300 can be secured in place to fixed or stationary portion of the vehicle 102 behind the steering wheel 702 with an upper mounting bracket 810. As shown, the upper mounting bracket 810 can be fastened or otherwise secured to a lower portion of a dashboard or a steering column housing 1002 of the vehicle 102. The steering column housing 1002 refers to a portion of the vehicle 102 that remains stationary while allowing the steering column 602 to rotate freely with the steering wheel 702 in response to movement of the steering actuator 300.

Figure 11:
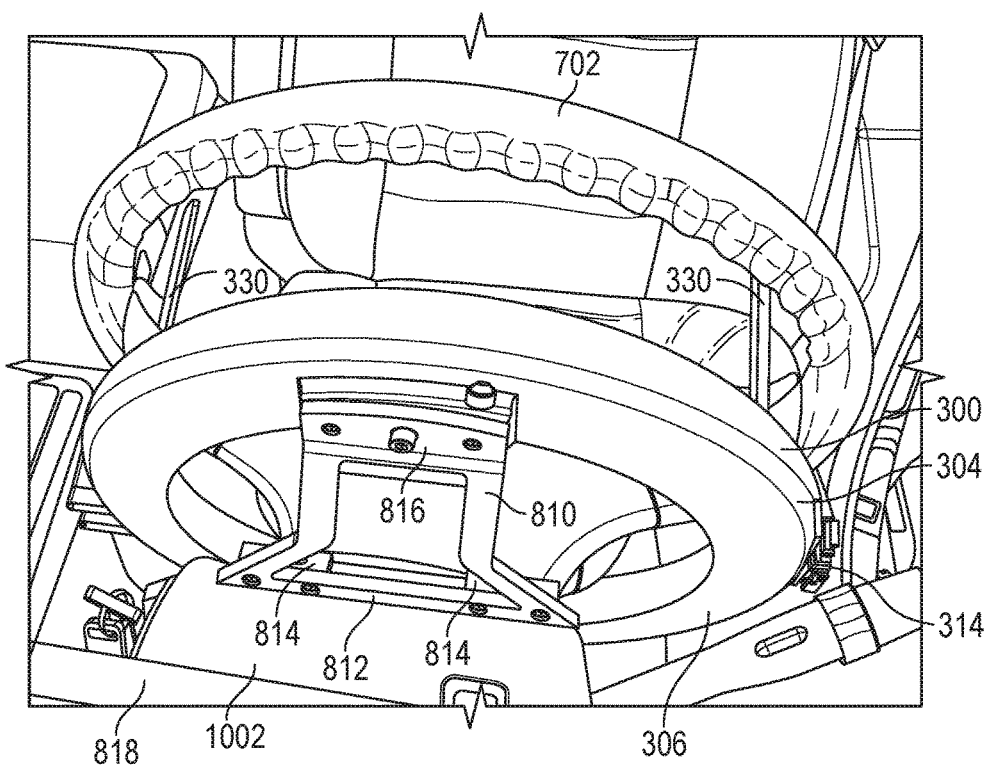
FIG. 11 is rear perspective view of the steering actuator of FIG. 3 applied to a vehicle.

For example, the upper mounting bracket 810 can be affixed to the steering column housing 1002 between an instrument cluster and the steering wheel 702. This is shown in FIG. 11. In a similar fashion, the upper portion 304 (e.g., the outer housing 302) of the steering actuator 300 also be fastened or otherwise affixed to the upper mounting bracket 810. In this way, the upper mounting bracket 810 can support the upper portion 304 of the steering actuator 300 as it surrounds the steering column 602.

In some embodiments, a lower mounting bracket 820 can also be used to secure the lower portion 306 (e.g., the steering actuator 300) to another stationary or fixed portion of the vehicle 102 under the steering wheel 702. In some embodiments, the lower mounting bracket 820 can be secured to a portion of the steering column housing 1002 or to a portion of the footwell, in front of the driver's legs, for example. In this way, the lower mounting bracket 820 can support the lower portion 306 of the steering actuator 300 as it surrounds the steering column 602.

FIG. 11 is top rear perspective view of the steering actuator of FIG. 3 applied to a vehicle. As shown, the upper mounting bracket 810 can have a lower end 812 fastened to the steering column housing 1002. The lower end 812 of the upper mounting bracket 810 can have one or more flanges 814 or other provisions that can accept fasteners to secure the upper mounting bracket 810 to the steering column housing 1002. In some embodiments, the lower end 812 of the upper mounting bracket 810 can be, for example, bolted to the steering column housing 1102.

The upper mounting bracket can also have an upper end 816. The upper end 816 can similarly fastened to the upper portion 304 of the steering actuator 300 using fasteners such as bolts or screws, for example.

Figure 12:
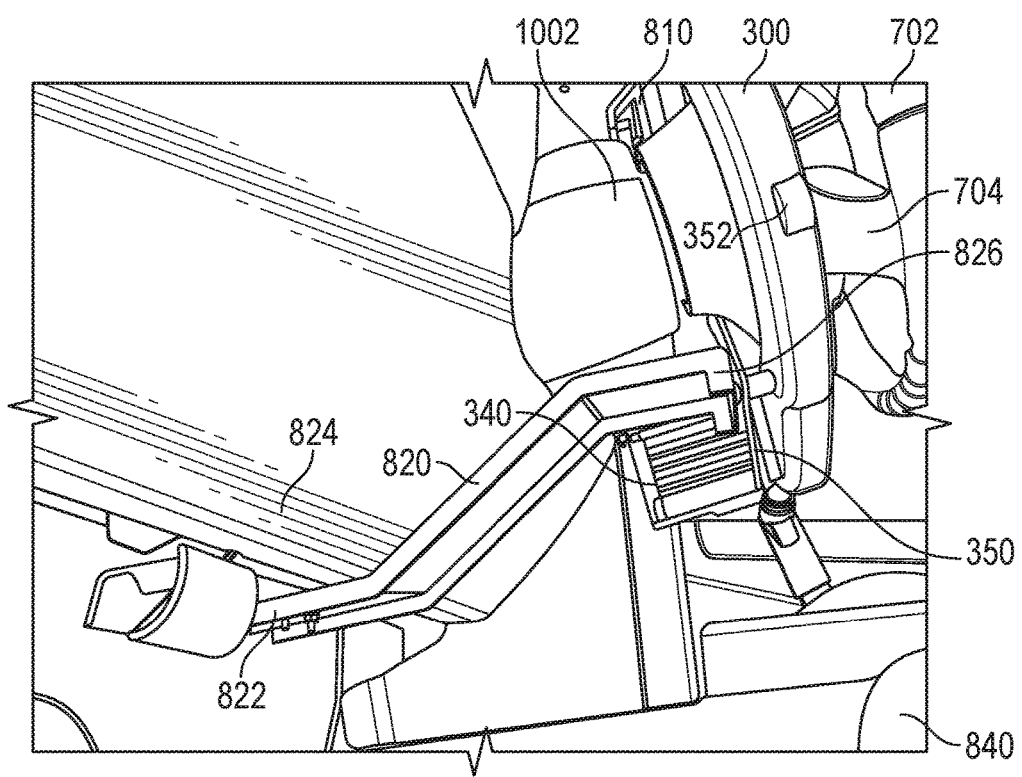
FIG. 12 is a bottom perspective view of the steering actuator of FIG. 3 applied to a vehicle.

FIG. 12 is a bottom perspective view of the steering actuator of FIG. 3 applied to a vehicle. The lower mounting bracket 820 can have a lower end 822 fastened or otherwise affixed to the vehicle 102 in, for example, a footwell 824. As described herein, the footwell 824 can be, for example, the portion of the vehicle 102 that surrounds a driver's feet and legs when seated in a driver seat 840. The footwell 824 can be the portion of the vehicle 102 opposite the driver seat 840 within the vehicle 102. The lower end 822 can be bolted or otherwise secured to the vehicle 102 in the footwell 824. In some other embodiments, the lower mounting bracket 820 can be secure to the steering column housing 1002. This could reduce the size of the lower mounting bracket 820 and reduce any intrusion on the driver compartment of the vehicle 102.

The lower mounting bracket 820 can also have an upper end 826. The upper end 826 can be fastened or otherwise affixed to the steering actuator 300. In some embodiments, the upper end 826 of the lower mounting bracket 820 can be bolted to the lower portion 306 of the steering actuator 300. In some embodiments, the mounting plate 350 can provide an interface or connection point between the steering actuator 300, the lower mounting bracket 820, and the servo motor 340. The mounting plate 350 can provide structural support to maintain contact (e.g., driving engagement) between the pinion teeth 346 of the pinion gear 344 and the teeth 327 of the inner gear ring 320.

Those of skill will appreciate that the various illustrative logical blocks (e.g., the various electronic and computer components described herein), and components described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

A software module (e.g., those for use with the nav module 204), can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

It will be understood that the above descriptions of various embodiment are given by way of example and not by limitation. Accordingly, various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this disclosure.

The above description of the disclosed embodiments is provided to enable any person skilled in the art to make or use the subject matter disclosed. Various modifications to these embodiments will be readily apparent to those skilled in the art, and the generic principles described herein can be applied to other embodiments without departing from the spirit or scope of the disclosure. Thus, it is to be understood that the description and drawings presented herein represent a presently preferred embodiment of the disclosure and are therefore representative of the subject matter, which is broadly contemplated. It is further understood that the scope of the present disclosure fully encompasses other embodiments that may become obvious to those skilled in the art.

What is claimed is:

1. A device for retrofitting a vehicle for unmanned operation, the device comprising:
    an outer housing having a gear race;
    an inner gear ring having a plurality of attachment points and located in the gear race;
    at least one tong coupled to the inner gear ring at one of the one or more attachment points of the plurality of attachment points, each tong of the at least one tong having an integral tong arm extending away from the inner gear ring and configured to engage with one or more spokes of a steering wheel of the vehicle; and
    a servo motor having a pinion gear drivingly engaged with the inner gear ring within the gear race, the servo motor configured to receive commands from a navigation computer.

2. The device of claim 1, wherein the outer housing and the inner gear ring surround a steering column of the vehicle.

3. The device of claim 2, wherein the inner gear ring comprises a removable gear ring section.

4. The device of claim 2, wherein the outer housing comprises an upper portion coupled to a lower portion by a hinge assembly, the upper portion having a first fastener end opposite the hinge assembly and the lower portion having a second fastener end opposite the hinge assembly, the first fastener end and the second fastener end configured to be coupled together with a connecting assembly to form the gear race and surround the steering column.

5. The device of claim 4 further comprising:
    an upper mounting bracket operably coupled to the upper portion of the outer housing and the vehicle; and
    a lower mounting bracket operably coupled to the lower portion of the outer housing and the vehicle.

6. The device of claim 2, wherein the outer housing comprises an upper portion coupled to a lower portion by a first connecting assembly at a first end, the upper portion being coupled to the lower portion by a second connecting assembly at a second end to form the gear race and surround the steering column.

7. The device of claim 1, wherein the at least one tong comprises two tongs, wherein each of the two tongs engages with the inner gear ring in positions which cause them to interact with the one or more spokes of the steering wheel.

8. The device of claim 1, wherein the at least one tong engages with the inner gear ring via the one or more attachment points, the at least one tong being adjustable to a position about a circumference of the inner gear ring.

9. The device of claim 1, wherein the outer housing further comprises one or more rollers operable to support a rotation of the inner gear ring along the gear race and within the outer housing.

10. A system for operating an unmanned vehicle comprising:
    a memory configured to store navigation data;
    a processor coupled to the memory and configured to generate commands for control of the vehicle;
    a steering actuator being coupled to the processor and operable to rotate a steering wheel of the vehicle according to the commands, the steering actuator having one or more tongs operable to engage one or more spokes of the steering wheel without being coupled to the steering wheel.

11. The system of claim 10, wherein the steering actuator further comprises:
    an inner gear ring having a plurality of attachment points formed about a top surface and operable to engage with the one or more tongs;
    an outer housing having a gear race formed to accept the inner gear ring in a clearance fit; and
    a servo motor operable to rotate the inner gear ring within the gear race according to the commands, wherein movement of the inner gear ring rotates the one or more tongs to rotate the steering wheel.

12. The system of claim 11, wherein the outer housing comprises an upper portion coupled to a lower portion via a hinge assembly at a first end, the upper portion and the lower portion forming a gear race when coupled by a connecting assembly at a second end.

13. The system of claim 12, wherein the inner gear ring has a removable gear ring section to accommodate a steering column during installation.

14. The system of claim 10 further comprising a plurality of sensors coupled to the processor and configured to provide at least speed and location information to the processor, wherein the plurality of sensors and the processor are operable to allow the unmanned vehicle to autonomously follow a preprogrammed mission plan.

15. A steering actuator for an unmanned vehicle, the unmanned vehicle having a dashboard, a steering column and a steering wheel having spokes, the steering actuator comprising:
- an outer housing formed to surround the steering column between the dashboard and the steering wheel, the outer housing having a gear race;
- an inner gear ring disposed within the gear race, the inner gear ring having a top surface formed with a plurality of attachment points and a plurality of gear teeth formed along a circumference of the inner gear ring;
- one or more tongs coupled to one or more attachment points of the plurality of attachment points, the one or more tongs extending through an interior portion of the steering wheel and interacting with the spokes without being coupled to any portion of the steering wheel; and
- a servo motor coupled to the outer housing and operable to move the inner gear ring and the tongs.

16. The steering actuator of claim 15, wherein the outer housing comprises an upper portion hingably coupled to a lower portion via a hinge assembly at a first end, the upper portion and the lower portion forming the gear race when coupled by a connecting assembly at a second end,
  wherein the upper portion and the lower portion each have a curved shape.

17. The steering actuator of claim 16 further comprising:
- an upper mounting bracket operably coupled to the upper portion of the outer housing and the vehicle; and
- a lower mounting bracket operably coupled to the lower portion of the outer housing and the vehicle.

18. The steering actuator of claim 15, wherein the servo motor is configured to receive commands from a navigation computer.

19. The steering actuator of claim 15, wherein the gear race comprises one or more rollers engaged with the gear teeth of the inner gear ring.

20. The steering actuator of claim 15, wherein the servo motor is drivingly engaged with the inner gear ring.

* * * * *